United States Patent
Abusch-Magder

(10) Patent No.: US 7,181,248 B1
(45) Date of Patent: Feb. 20, 2007

(54) DESIGN AND CONSTRUCTION OF WIRELESS SYSTEMS

(75) Inventor: David Abusch-Magder, Maplewood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 7 days.

(21) Appl. No.: 11/200,937

(22) Filed: Aug. 10, 2005

(51) Int. Cl.
*H04Q 7/20* (2006.01)
(52) U.S. Cl. .................... 455/562.1; 455/423; 455/424
(58) Field of Classification Search ............... None
See application file for complete search history.

(56) References Cited

U.S. PATENT DOCUMENTS 6,738,016 B2 * 5/2004 Li et al. ................. 342/360
2002/0006799 A1 * 1/2002 Rappaport et al. .......... 455/446
2004/0017783 A1 * 1/2004 Szentesi et al. ............. 370/256
2005/0256694 A1 * 11/2005 Taylor ........................ 703/22

\* cited by examiner

*Primary Examiner*—Erika A. Gary

(57) ABSTRACT

In the design and/or construction of a wireless communication system, a parameter optimization determination is performed. Such determination is accomplished by first clustering parameters with strong interdependence. In a second operations a subset of the clustered parameters are removed from consideration by imposing constraints on the system and/or on the parameters to yield a similar system determination problem. In a third operation, parameters remaining after the second operation are optimized for a chosen performance metric. Finally, parameters removed in the second operation are optimized for a chosen performance metric with the parameters optimized in the third operation, set to an optimized value determined in the third operation.

22 Claims, 2 Drawing Sheets

DESIGN AND CONSTRUCTION OF WIRELESS SYSTEMS

TECHNICAL FIELD

This invention relates to wireless communication systems and more particularly to systems employing a multiplicity of base stations.

BACKGROUND OF THE INVENTION

For wireless communication systems a geographic area is divided into a plurality of cells, generally with at least one base station in each cell. A mobile communication unit wishing to transmit information, e.g. voice or data, establishes a communication link to one or more base stations. (Generally, but not invariably, the contacted base stations are located spatially near the mobile unit.) The information is transmitted from the mobile unit to the base station and then from the base station into the communication network. Although requirements vary depending on the technology and bandwidth, acceptable operation of the system for voice calls typically requires signal strength of approximately −95 dBm or greater.

Numerous system parameters affect the quality of system operation. For example, the number of base stations, the geographic location of these base stations, the type and number of antennae at each base station, the orientation of each antenna (azimuthal angle 1 FIG. 1, and radial angle 2 in FIG. 1 relative to projection 3), transmit power, pilot power, carrier frequency and antenna type all typically influence system efficacy. (Such parameters include both discrete parameters, e.g. antenna type, and continuous parameters, e.g. antenna orientation parameters.) Additionally, there are generally constraints on these parameters and on the system. (In the context of this description, both types of constraints are subsumed by the term constraints.) Constraints on parameters are imposed by physical and practical considerations. As exemplary of the former, the mounting brackets on antennae often physically preclude some portion of the azimuthal and radial angular spectrum. Similarly, topography such as hills and/or structures such as tall buildings make antenna azimuthal and radial angles directed toward such natural and man-made obstacles impractical. System constraints are exemplified by antenna radiation patterns, a variety of technology requirements some of which are imposed by a previously agreed upon standards, and the signal processing design of mobile terminals and base stations. Thus, in determining the potential quality of a communication system the parameters should be considered in view of these constraints.

Since a plethora of parameters and constraints influence the system, and since generally there is a strong interdependence between and among parameters, any attempt to find an optimal design and implement such a system involves an extremely complicated calculation dependent on these parameters and constraints. Indeed, the extent of interdependence in a wireless system environment makes the problem particularly difficult. Therefore the search for optimal designs has not been carried out directly, but instead has advanced through the search for superior if suboptimal designs based on a variety of tractable algorithms.

A measure of effectiveness of such an algorithm is the improvement in calculated system performance (from the inception of calculations to the conclusion) per unit time of calculation. One of the most commonly employed approximations for satisfying the improvement per unit time criterion involves an iterative approach to optimization. Two or more specialized algorithms each of which optimizes a subset of the parameters is employed iteratively to satisfy the improvement/unit time criteria. (Optimized parameters in the context of this disclosure is not necessarily the best choice of parameters possible, but a choice of parameters that improves the calculated performance of the system.) For example, it is often necessary for the design and construction of a system to perform a calculation to choose a number of base locations from an ensemble of possibilities, e.g., choose 70 locations for base station placement from 100 possibilities, and to set the azimuthal and radial orientation for each antenna at each chosen location. To make the problem manageable, in one approach, an iterative procedure is employed at each cycle of the iterations including, as applied to the earlier example, A) starting with all possible sites and optimizing the antennae orientations or choosing a starting orientation for the antennae B) optimizing by a suitable algorithm to eliminate locations e.g. 5 locations, and then C) optimizing by a suitable algorithm angles for the antennae (e.g. 3 antennae), at each remaining location. (The actual number of antennae at each location as previously discussed is a system constraint.) Thus, as an illustration a flow chart for the example (pick 70 locations from 100 possible locations and set the orientation for the three antennae at each of the 70 chosen locations) is shown in FIG. 2. In the first step 21, the antennae angles are initialized, for example, to be the allowed value closest to pointing out to the horizon with equal spacing in the azimuthal direction for the 300 possible antennae (3 at each of 100 possible locations). An antenna optimization algorithm is then utilized to choose desirable orientations for each of the antennae. Then in step 22 a location optimization is used to eliminate a number of locations, e.g. 5. (Of course fewer locations could be eliminated in such step but at a cost of substantially increased computing time or more locations could be eliminated at the cost of decreased performance improvement. The number of locations actually eliminated at each step is a matter of choice depending on the system design and construction goals.) The antennae angle optimization algorithm in step 23 is then used to choose a desirable orientation for each of the remaining 285 antennae distributed at the remaining 95 locations. Fixing the antennae orientation determined in step 23 the procedure then cycles with the location optimization algorithm in step 24, choosing 90 of the remaining 95 locations. (It is necessary to perform the antennae optimization for desirable improvement after each elimination step due to the strong interdependence of location and antennae orientation parameters as discussed earlier.) In the continuing iterative procedure the orientation of the remaining 270 antennae are optimized in step 25. Alternation continues until 70 locations with a total of 210 optimized antennae orientations are chosen. In all, 6 location optimizations are performed on respectively 100, 95, 90, 85, 80, and 75 locations as well as 7 antennae optimization procedures on respectively 300, 285, 270, 255, 240, 225 and 210 antennae.

Thus despite the simplification of fixing parameters or optimizing over a subset of variables, the problem still requires multiple optimization steps, each of which is a difficult optimization of a large number of parameters, e.g. antennae orientation parameters and antennae locations. Accordingly, although simplification is achieved, the approach is nevertheless not simple. Substantial time (generally 1 week or more) even on a high speed computer is still needed to obtain an accurate solution for even modest system design problems. Decreasing the required time for obtaining an accurate solution provides many advantages.

For example, it is possible to perform the solution process repeatedly in an acceptable time period to accommodate the evolution of design goals and constraints inherent in reaching a design that satisfies the various evolving exigencies envisioned for the system. Additionally, the ability to reach a rapid solution aids in the adjustments and engineering choices involved in constructing a system. As a result both the design and construction of wireless communication systems would benefit from an approach that enhances the performance improvement per unit calculation time for determinations that are part of the design and/or construction process.

SUMMARY OF THE INVENTION

It has been found that during optimization to obtain parameters for a design or construction process, the speed of determining accurate parameters for use is significantly enhanced by employing specific expedients. This determination step expedient is particularly useful in problems having a strong coupling between at least some of its parameters. (Strong coupling between two parameters in the context of this invention means a coupling between parameters x and y defined as a ratio of derivatives (or their discrete analog) of at least 0.01 as to the underlying performance metric (e.g. system coverage capacity, latency, maximum throughput, maximum bandwidth, total revenue generated or some combination thereof)) for which at least one optimization operation is to be performed. In particular the coupling is the maximum value obtained over all allowed parameters, $x_0$, $y_0$ (considering the constraints) of the performance metric, f, of the following ratio:

$$\frac{f(x_0, y_0) \frac{\partial^2 f}{\partial x \partial y}\Big|_{(x_0, y_0)}}{\frac{\partial f}{\partial x}\Big|_{(x_0, y_0)} \frac{\partial f}{\partial y}\Big|_{(x_0, y_0)}}$$

The parameter determination step of the design and/or construction process includes four operations. The first operation is clustering the parameters being considered. That is, all the parameters whose values are to be determined are grouped into at least two clusters. The elements (parameters) of a cluster are chosen so that the coupling between each possible pair of elements in the cluster is at least 0.01, preferably at least 0.1.

In the second operation of the determination step at least one parameter is removed from consideration in at least 5 percent of the clusters by modifying the constraints of the original problem. In this parameter removal the parameters of an individual cluster are considered relative to the modified constraints. For example, a new constraint is established by a change of the antenna radiation pattern such that each antenna has, at any geographic point, a propagated signal strength of the maximum obtainable at that point from such antenna when all possible orientations under the original constraints of that antenna are considered. By imposing this new constraint the antennae orientation parameters of the original problem are removed from being a parameter whose variation affects the performance metric. In essence, the removed parameter is fixed. However, such removal of parameters should not be arbitrary. It should be done in a manner that satisfies a similarity criterion, i.e. at least one value taken by the function of signal strength versus geographic location under the original set of constraints should, for each antenna be similar to the signal strength under the combined original and new constraints. In the context of the invention similar signal strength occurs when the signal strength function for at least one set of parameters after imposing the new constraint(s), differs by no more than 3 dB from the signal strength function under the original constraints for the same chosen set of parameters for some value of the frozen parameters and for at least one point in at least 50% of 20 equal sized, regions covering the cell in which the antenna is located. (The cell is defined as all geographic points where the signal strength from the base station being considered under the new constraints and for the chosen parameter set is greater than −95 dBm.) For the previous example of eliminating antennae orientation parameters with the new constraint (imposed by a change of the antenna's radiation pattern), for every location in the cell the signal strength under the combined original and new constraints is equal to the signal strength under the original constraints for the antennae orientation yielding the maximum signal strength at such point. Thus the similarity criterion is satisfied by the exemplary constraint. (Significantly, the imposed limitation in this example is not physically realizable. The constraints imposed to remove parameters need not comport with physically realizable or practical system configurations or parameter values provided the similarity criterion is satisfied.)

In the third operation of the determination step, a suitable algorithm is employed using the new constraints to optimize all, or a portion of, the parameters that were not removed in the second operation. Again, in the example, the parameter optimized would be all or a portion of the parameter governing the presence of a cell at a specific location since the coupled parameters of antenna orientation are removed in operation 2. It is advantageous but not essential that the optimized parameters are those that have a significant effect on the signal versus location for at least one antenna. (A parameter has a significant effect on the signal strength versus location for an antenna if the dependency of signal strength over this parameter varies more than 10 percent over the range allowed for at least one given choice of all other parameters.) Since elimination of an antenna location with its antennae certainly significantly affects (sets to zero) the signal strength versus location function associated with such antennae this parameter has a significant effect and thus is advantageously optimized.

In the final operation of the determination step, the parameters optimized in the third operation are set at an optimized value (or constrained to a range of values) and the parameters removed in operation 2 are optimized using the constraints of the original problem (those before imposing the new constraints.) Thus in the example the locations chosen in operation 3 would be used and the antennae orientations for antennae at these chosen locations would be optimized.

By using the procedure of the invention an accurate determination is made in a significantly shorter time than the typical iterative approach. This improvement is demonstrated by considering the operations required for the exemplary problem. In the first operation step the parameters are clustered so that each cluster contains a location and the orientation parameters for the antennae at that location. In the second operation the orientation parameters are removed from consideration by imposing the new signal strength maximum criterion. In the third operation an optimization is done over the location parameters so, in the example given, of the initial 100 locations, 30 are eliminated. Then in the fourth operation the 70 optimized locations are fixed and optimization is done over 210 antenna orientations. Most significantly, the optimizations in the iterative process of 285 orientations for 95 locations (step 23 in FIG. 2), 270 orientations for 90 locations (step 25), 255 orientations for 85 locations, 240 orientations for 80 locations, and 225 orientations for 75 locations are totally eliminated. Thus a significant time saving is possible.

DETAILED DESCRIPTION

As discussed, the invention involves a process for design and/or construction of a wireless communication system including a step for determining parameters used in such system design and/or construction. The parameter determination step includes four operations. Not all conceivable parameters defining a system need be determined. A set of parameters (generally a subset of all possible parameters) is chosen for determination. In the design and/or construction process the constraints are also set. These constraints include both system constraints and parameter constraints. For example, chosen constraints on the system as previously discussed include such things as antenna radiation patterns, signal processing design of mobile terminals and base stations, and requirements of applicable standards. Similarly, constraints on parameters are also set. For example, acceptable antenna orientations to avoid physical signal barriers and antenna orientations allowed by the antenna mountings are imposed on the parameters.

Once the parameters to be determined, the system constraints and the parameter constraints are chosen, the parameters are clustered into at least two clusters of at least two such parameters each. The parameters of a cluster are chosen so that the coupling between each possible pair of parameters in the cluster is at least 0.01. Thus, for example, a possible cluster could include a specific location as one parameter, and the orientation parameters for each antenna at that location. As can be seen the coupling between each of these parameters would be generally greater than 0.01, and in fact greater than 0.1, because if the location is eliminated during optimization the effect of antennae orientation for antennae at that location would disappear.

In the second operation of the determination step in at least 5% of the clusters at least one parameter is removed as a variable by redefining the constraints of the original problem. Thus additional constraint(s) (either system or parameter constraints) are imposed so that the requisite parameters are removed as a variable. (In the context of this invention an additional constraint comprehends both the inclusion of new constraint(s) and the modification of the restrictions of an original constraint.) Although, as discussed, an advantageous result is achieved by removing from consideration a parameter from each of at least 5% of the clusters, it is preferable to remove one or more parameters from at least 50%, more preferably 90% of the clusters. Additionally, it has been found to be of further advantage to remove at least 5%, preferably 10%, most preferably 20% of parameters in total from each cluster during the second operation of the determination step to further reduce computational complexity.

Figure 1:
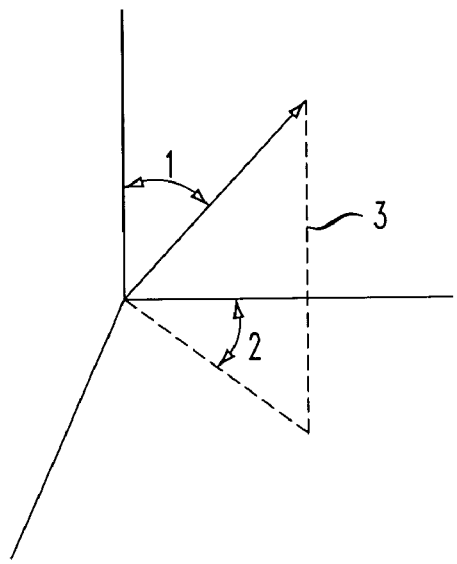
FIG. 1 is illustrative of parameters involved in antenna orientation.
Figure 2:
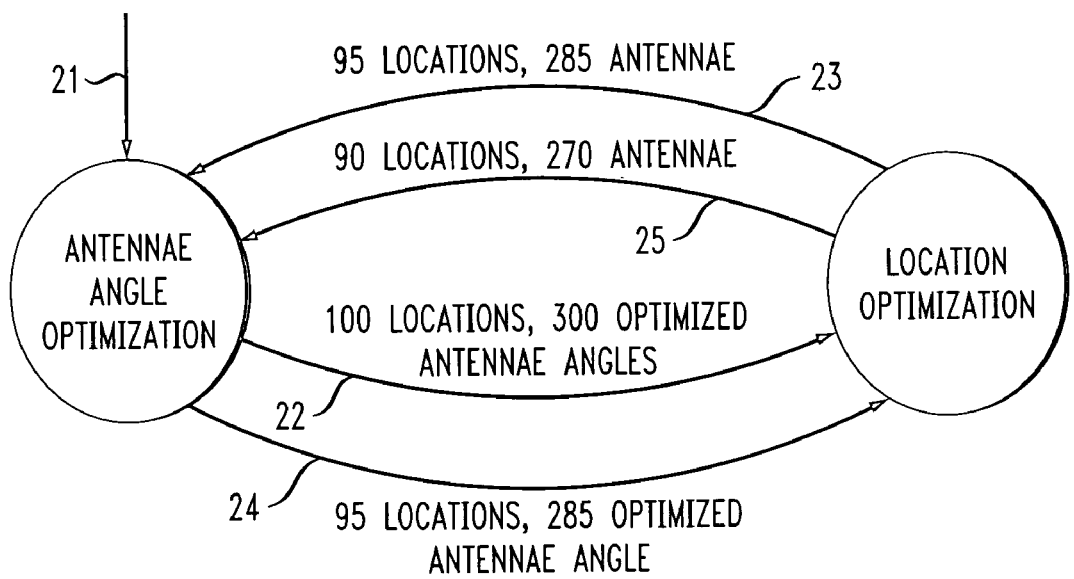
FIG. 2 is a flowchart of calculations involved in the design and construction process, FIG. 3 exemplifies possible imposed constraints for removing parameters.
Figure 3:
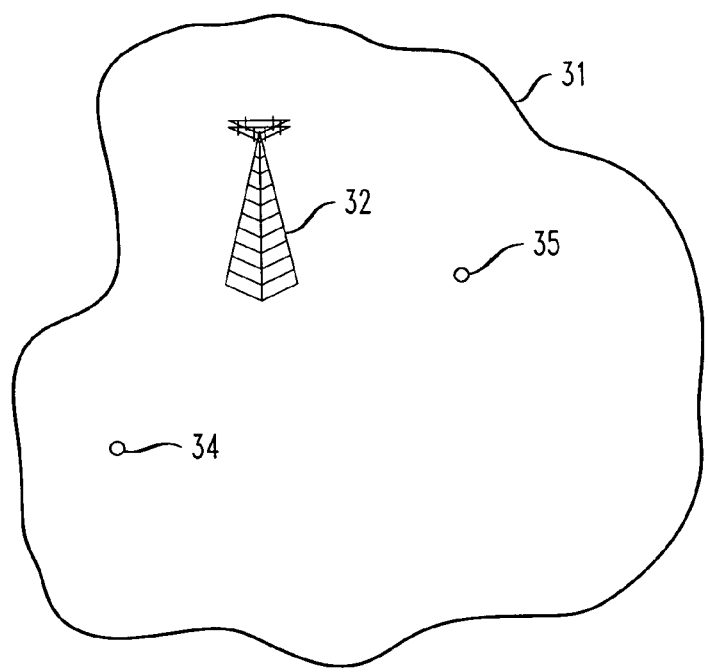

Although the particular constraint chosen to remove parameters from consideration during the third operation of the determination step is not limited to any specific form, it is often particularly useful to take into account many or all of the various possible values which might be assumed by the variable to be eliminated. This should be done without regard to the achievability (physical, economical or otherwise) of the constraint so created. For example, one useful, imposed constraint is that each antenna has a propagated signal strength at any geographic point that is the maximum obtainable from such antenna. Thus for example, as shown in FIG. 3 in a cell 31 with base station 32 the maximum signal strength at point 34 is attained for a particular antenna having a θ orientation parameter illustratively of 20 degrees and a φ orientation parameter illustratively of 37 degrees. Similarly at geographic point 35 the maximum signal strength is illustratively obtained for a θ of 15 degrees and a φ of 58 degrees. These maximum values at each geographic point are employed as the new constraint even though the antenna parameters that yield such maximum values are generally different from one geographic point to another. Thus this imposed constraint fixes the signal strength dependency on, for example, antennae parameters, encountered at each geographic location and accordingly removes θ and φ of the antenna as a parameter that affects such signal strength. The θ and φ parameter is thus not optimized in the third operation for the determination step since it has been set in operation 2. It should be noted that the additional constraint just illustrated is not physically realizable but nevertheless quite useful.

Figure 4:
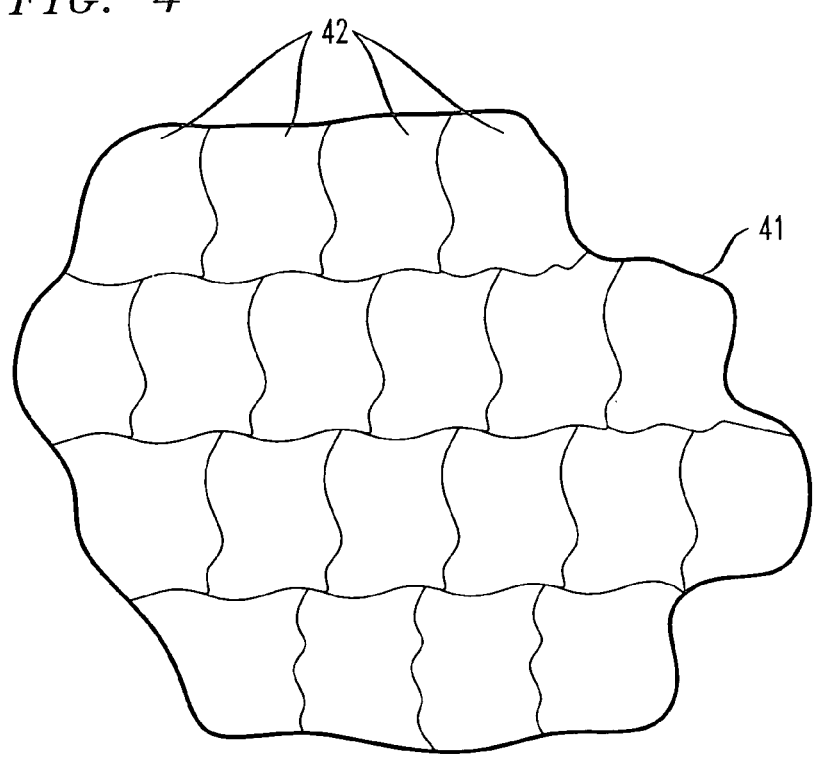
FIG. 4 is illustrative of concepts involved in the similarity criterion.

Imposition of the new constraint to remove parameters should be done so that a similarity criterion is satisfied, i.e., so that the problem presented in the determination step is similar both before and after imposition of the new criterion. The determination problem before and after imposition of new constraint(s) is similar if the signal strength versus geographic location behavior under the original set of constraints as modified by the new constraint(s) for each antenna is similar to that under the original constraints. This comparison to determine similarity is done in the context of a set of regions that cover the cell in which the antenna is located. The cell, in turn, is defined by the region where the signal strength from the antenna being considered under the original constraints as modified by the new constraints and for the set of non-removed parameters being considered for satisfying the similarity criterion is greater than −95 dBm. This cell region is divided into 20 regions of equal area. Thus as shown in FIG. 4, if the cell region 41 is considered, it is composed of twenty regions, 42, of equal area.

For at least one such cell division into 20 equal areas, and for at least 50% of the 20 equal-sized regions in such division there should be at least one point within the region such that the signal strength at this point differs by no more than 3 dB after imposing the new constraint(s) when compared to its value under the original constraints. (Many potential divisions of the cell are possible but the similarity criterion need be satisfied for only one such division. Additionally it is possible that the cell includes discrete portions that do not have a common boundary with other portions of the cell. Possible divisions include partitioning such portions into the 20 regions to produce the equal area division.) Thus as shown in FIG. 4 if the points 42 have a signal strength that differs no more than 3 dB after imposition of the new constraint from before such imposition, the similarity criterion is satisfied. There well may be many more points that satisfy the 3 dB limitation but it is sufficient that there are at least 10 regions with at least one such point each. It should be noted that every point within a region has a multiplicity of signal strength values since there is one value corresponding to each possible combination of the allowed parameter values for the constraints imposed. If one of these possible values after imposition of the new constraints is equal or within 3 dB of one such value at the same point and for the same set of parameters before imposition of the new constraints then a point in the region satisfies the 3 dB limitation. (For each particular point comparison is made with the same set of parameters and for any value of the parameters removed in the second step) as discussed. However the parameter set used at one point need not be the same as the parameter set used at another point.)

Once constraints satisfying the similarity criterion are chosen to remove parameters as discussed above, the third operation of the determination step is performed using a suitable algorithm with the constraints as modified by the new constraints to optimize some or all of the remaining parameters. Any parameter that has not been removed and is not being optimized over is considered to be constrained. It is generally beneficial not to constrain parameters which have not been removed and which have a significant effect on the performance metric or which are coupled strongly with variables that are being optimized. This benefit is especially true if an algorithm is used as part of steps 3 or 4 that is adequate to optimize such parameters without significant additional computation time. The parameters optimized in the third operation are advantageously (but not necessarily) those that have a significant effect on the signal strength. Such parameters are deemed to have a significant effect on the signal strength if the dependency of the performance metric over the allowed values of such parameter varies more than 10% at any geographic point in the cell with the cell defined as for the similarity criterion. Thus, for example, signal strength associated with a given antenna has a value that generally depends on a multiplicity of the remaining parameters. If for some choice of all the parameters but the one under consideration the signal strength changes more than 10% then such parameter under consideration has significant effect on such signal strength. This parameter is considered to have a significant effect on the signal strength even if there also exists a set of parameters such that over the full range of the parameter being considered the signal strength does not change by 10%.

Typically there are commercially available algorithms for use in such optimization operations. For example, algorithms such as the greedy algorithm are useful for optimizing cell site locations while algorithms such as genetic or simulated annealing based algorithms are suitable for optimizing antenna orientation parameters An algorithm is considered acceptable if it improves the performance of a system.

In the third operation using a suitable algorithm parameters being allowed to vary under the new constraints are optimized. The optimized values (or range of values determined in the third operation) are employed either 1) to guide the choice of such parameters in the fourth operation or 2) to provide a further constraint in the fourth operation. In the former case an optimized value is obtained and used in the subsequent step or the optimized value is employed as a guide for choosing a fixed value for such parameter in the fourth operation. (Such fixed value obtained from such guidance in the context of this invention is also considered an optimized value.) In the latter case a plurality, e.g. a range, of optimized values are obtained for a parameter, and, in the fourth operation such parameter is constrained to such plurality of values and optimized together with parameters removed in the second operation. The parameters removed by imposing the additional constraint(s) are optimized using appropriate algorithms (not necessarily the same as used in the third operation) with the parameters optimized in the third operation being set to values using the result of the third operation. In essence, in the third operation, parameters not removed from consideration by the new constraints are optimized and in the fourth operation these optimized parameters are fixed (or constrained) while all, or a portion of, the parameters removed in the third operation are optimized under the original set of constraints. Clearly the values obtained in the third operation depend on the variety of things including the algorithm employed. By use of one or a multiplicity of algorithms it is possible to determine in the third operation a range of parameter values that improve the performance metric under consideration. Use of such optimized parameters in the fourth step while optimizing all or a portion of the parameters removed in the second operation allow improved optimization per unit time.

The invention claimed is:

1. A method for the design or construction of a wireless communication system having a plurality of antennae including the step of optimizing a set of parameters of said system wherein said system has original imposed constraints, said optimization step comprising the operations of
   1) clustering said parameters into groups of related parameters, such that two parameters may belong to the same group only if their joint effect on a performance metric according to a suitable measure equals or exceeds a threshold;
   2) imposing one or more additional constraints with the effect that:
      a) in each of at least some groups, at least one parameter is effectively fixed; and
      b) the function of signal strength versus geographic location in relation to the corresponding function without additional constraint satisfies a similarity criterion;
   3) optimizing under the combined original and additional constraints relative to a first performance metric of the wireless communication system to determine a set of one or more optimized values for each parameter; and
   4) under the original constraints, optimizing at least a portion of the previously fixed parameters relative to a second performance metric of the wireless communication system, wherein those parameters optimized in operation 3 are constrained to said sets of optimized values.

2. The method of claim 1 wherein said first performance metric and said second performance metric are the same.

3. The method of claim 1 wherein the spatial orientation of said antennae comprises at least a subset of said parameters.

4. The method of claim 1 wherein the geographic location of said antennae comprises a subset of said parameters.

5. The method of claim 1 wherein said first performance metric comprises signal strength.

6. The method of claim 1 wherein said first performance metric comprises network capacity.

7. The method of claim 1 wherein said first performance metric comprises network coverage.

8. The method of claim 1 wherein at least one parameter in at least 5% of said groups is removed in operation 2.

9. The method of claim 1 wherein at least one of said parameters is removed from at least 50% of said groups in operation 2.

10. The method of claim 1 wherein at least one of said parameters is removed from at least 90% of said groups in operation 2.

11. The method of claim 1 wherein said additional constraint lacks a physical analogue.

12. The method of claim 1 wherein said parameters optimized in operation 3 or 4 comprise antenna tilt or antenna azimuth.

13. The method of claim 12 wherein said parameter optimized in operation 3 or 4 comprises antenna site location.

14. The method of claim 1 wherein said parameter optimized in operation 3 or 4 comprises antenna site location.

15. The method of claim 1 wherein said parameters include discrete parameters.

16. The method of claim 1 wherein said parameters include continuous parameters.

17. The method of claim 1 wherein said parameters include carrier frequency.

18. The method of claim 1 wherein said parameters include antenna type.

19. The method of claim 1 wherein said plurality of optimized values comprise a range of optimized values.

20. The method of claim 1 wherein said additional constraint comprises a change in antenna radiation pattern.

21. The method of claim 1 wherein each pair of parameters of a group has a coupling of at least 0.01.

22. The method of claim 21 wherein said coupling is at least 0.1.

* * * * *